Oct. 2, 1973   E. DEL PIERO ET AL   3,763,297
METHOD FOR TRIMMING THE BOTTON OF HOLLOW SYNTHETIC
RESIN ARTICLES
Filed Feb. 4, 1971                    2 Sheets-Sheet 1

INVENTORS.
Elio Del Piero
Willy Wautriche

BY *Spencer & Kaye*

ATTORNEYS.

United States Patent Office 3,763,297
Patented Oct. 2, 1973

3,763,297
METHOD FOR TRIMMING THE BOTTOM OF HOLLOW SYNTHETIC RESIN ARTICLES
Elio Del Piero, Zaventem, and Willy Wautriche, Brussels, Belgium, assignors to Solvay & Cie, Brussels, Belgium
Filed Feb. 4, 1971, Ser. No. 112,726
Claims priority, application Belgium, Feb. 5, 1970, 84,814
Int. Cl. B29c 17/07, 17/12
U.S. Cl. 264—98                    1 Claim

ABSTRACT OF THE DISCLOSURE

Method for removing the unwanted material from the bottom of articles manufactured by blow-molding. A parison is enclosed in a blow-mold cavity and a knife is moved past the bottom of the mold transversely with respect to the closing plane thereof to shear off the unwanted material. The knife may be double edged so as to shear off the unwanted material from parisons enclosed in successive molds. The knife is preferably mounted on one arm of a lever member having two arms. The knife may then be moved by the actuation of the other arm of the lever.

BACKGROUND OF THE INVENTION

This invention relates to a method for trimming the bottom of hollow synthetic resin articles during their manufacture by the process of extrusion blow-molding, and to apparatus particularly suitable for performing this trimming process.

Several methods have been proposed for performing the trimming of the bottom of hollow synthetic articles during their production cycle. Each of these known methods has advantages, but they also have disadvantages. Thus, for example, some require an unduly long process time, others do not permit easy removal of unwanted material and others require irregular or abrupt movements incompatible with the smooth running of certain types of molding machines.

SUMMARY OF THE INVENTION

It is the object of the present invention to provide a trimming method and an apparatus for performing the same which require only a short process time and which permit easy removal of unwanted material.

In addition, it is an object of the present invention to provide a method and apparatus which is compatible with the smooth running of a molding machine.

According to the present invention, these and other objects are achieved during the manufacture of hollow synthetic resin articles by an extrusion blow-molding process by providing a method of trimming the bottom of the articles. This method comprises the steps of enclosing a parison in a blow mold cavity and moving a knife past the bottom of the mold transversely with respect to the closing plane thereof to shear off unwanted material at the bottom of the article.

The present invention also sets out a particular device for carrying out the method. This apparatus preferably comprises a knife mounted on one arm of a lever member and arranged so that the edge of the knife is adjacent to the bottom of a mold in proximity to the mold's closing plane. This knife is adapted to be moved, after closure of the mold, transversely with respect to the closing plane of the mold by actuation of the other arm of the lever.

The method and apparatus according to the present invention are particularly advantageous when use is made of a rotary machine which has a plurality of juxtaposed molds for molding hollow articles. In this instance, the molds are preferably double-cavity molds which permit the simultaneous molding of two articles placed neck to neck. It is then possible with the method and apparatus according to the present invention to simultaneously trim two consecutive mold bottoms. This is achieved by providing a double-edged knife which is arranged between two successive molds, each of the edges of the knife being adapted to be moved past the bottom of one of the two molds adjacent to the knife.

DESCRIPTION OF THE PREFERRED EMBODIMENTS

Figure 1:
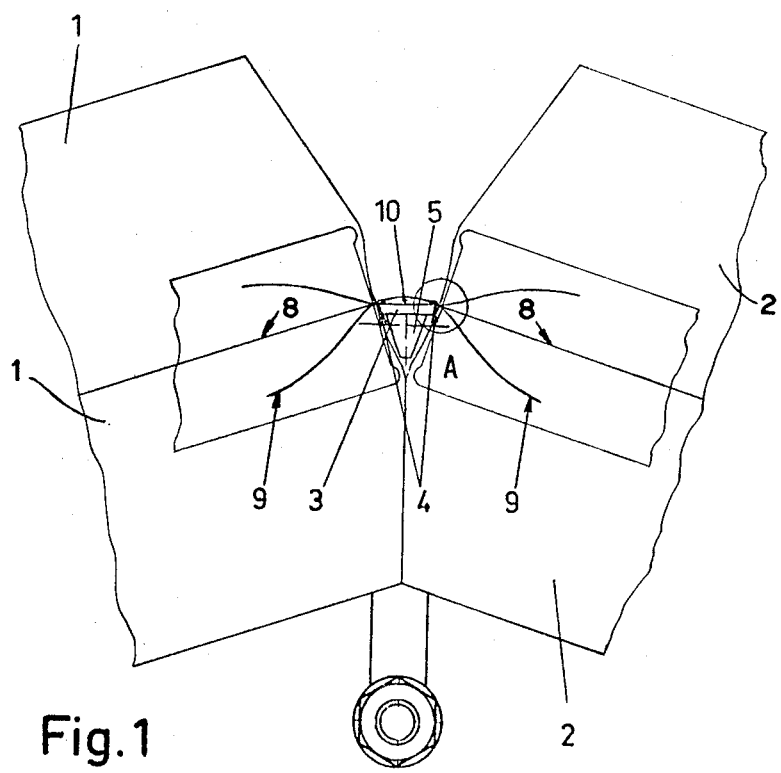
FIG. 1 is a partial, schematic elevation view showing a trimming device according to the present invention arranged between two successive molds of a rotary molding machine.
Figure 3:
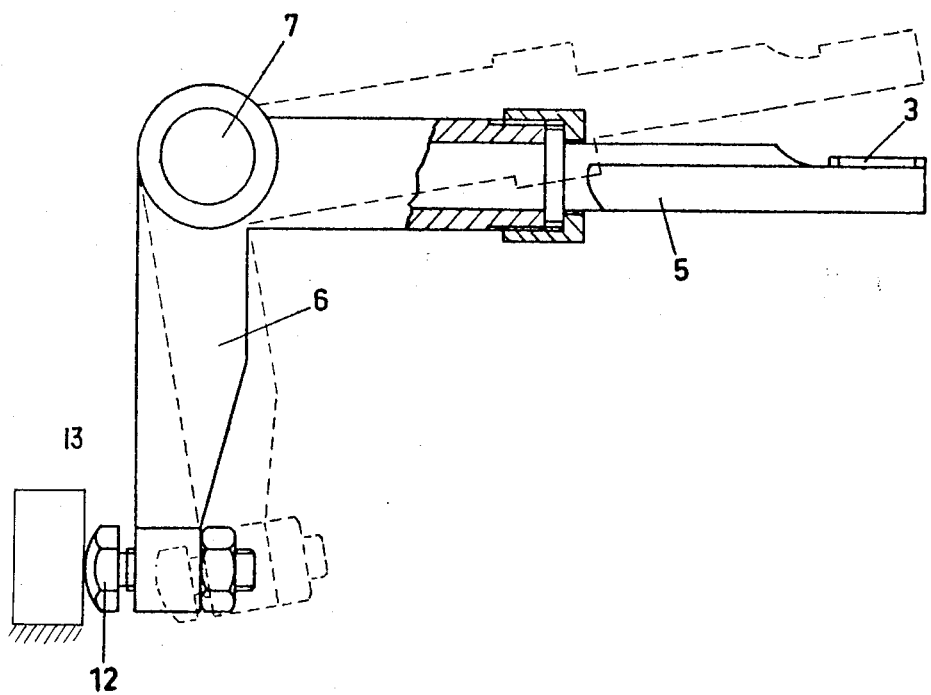
FIG. 3 is a schematic elevation view, partly in cross section and perpendicular to FIG. 1, of a trimming apparatus according to the present invention.

FIG. 1 of the drawings shows schematically two successive double-cavity molds 1 and 2. The trimming apparatus in this embodiment has a double-edge knife 3 with edges 4 mounted on one arm 5 of a lever member 5, 6 (FIG. 3). Lever member 5, 6 is mounted to pivot about axis 7, as shown in FIG. 3. Axis 7 is arranged so that knife 3 is permitted to move vertically up and down when oriented as in FIGS. 1 and 3 of the drawings. The other arm 6 of lever member 5, 6 has a head 12 which functions as a cam follower. Head 12 may be a suitable nut and bolt arrangement.

Our patent application Ser. No. 776,968 filed Nov. 19, 1968, now Patent No. 3,585,682, issued June 22, 1971 describes a rotary blow molding machine having double cavity molds. The method and the apparatus according to this invention are, for example, particularly suitable for this type of blow molding machine.

Figure 2:
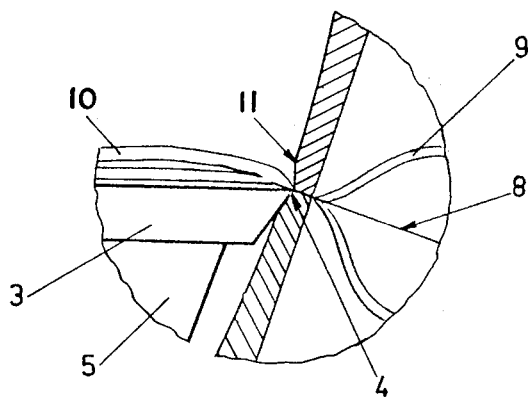
FIG. 2 is a detail view of the area shown in circle A of FIG. 1.

In the "rest" position of the trimming apparatus, as shown by the solid lines in FIG. 3, the two edges 4 of the knife 3 are arranged to abut the bottom of the two molds 1 and 2. The body of knife 3 is arranged just below the closing planes 8 of molds 1 and 2. This position can be seen in more detail in FIG. 2 of the drawings.

In the plane perpendicular to that of FIG. 1, the knife may lie approximately parallel to the closing planes 8 of the molds 1 and 2, and its configuration and its path should be determined with due regard to the configuration of the bottoms of the molds 1 and 2.

Before the trimming operation, the unwanted material at the bottom of the article being molded can be substantially in contact with the knife 3, and the knife 3 can thus contribute to the cooling of this unwanted material.

The method according to the present invention is carried out by first enclosing a parison 9 in, for example, the two successive molds 1, 2 of a known rotary machine. Simultaneously with this step, the head 12 passes over, for example, a cam 13 which is fixed to a stationary frame of the molding machine. Cam 13 causes lever member 5, 6 to pivot about axis 7 and raise knife 3 so that it moves transversely to the closing planes 8 of molds 1 and 2. As a result of this movement, the cutting edges 4 of the knife 3 shear off the unwanted portion 10 of the parison 9 against the faces 11 of the mold bottoms. The knife 3 also acts to eject this unwanted portion 10 from the molding machine.

The end position of the trimming device is shown by dashed lines in FIG. 3.

The stroke of the knife 3 during the trimming operation can be very short—for example, only a few millimeters—and, consequently, the time required to perform the trimming operation can also be very short.

Although the embodiment described above is for trimming two successive molds in a rotary machine, it is to be understood that the novel method and apparatus of the present invention may be used with only a single mold. In this instance, only a single-edged knife need be used.

It will be understood that the above description of the present invention is susceptible to various modifications, changes and adaptations, and the same are intended to be comprehended within the meaning and range of equivalents of the appended claim.

We claim:

1. A method of trimming the bottom of hollow synthetic resin articles during their manufacture by extrusion blow-molding of parisons in a rotary machine having a plurality of juxtaposed molds arranged along a circular path for rotation about an axis, with each mold having a closing plane which extends parallel to the axis of rotation, and with the portion of the parison extending between adjacent molds representing unwanted material to be ejected from the machine, comprising the steps of:

(a) mounting a double-edged knife between two successive molds such that it is disposed to the side of the closing planes of the successive molds which is toward the machine axis, and alongside unwanted material extending between the successive molds; and (b) moving both blade edges of the knife in the same direction away from the axis of rotation so that each moves past the bottom of a respective one of the two molds adjacent the knife and transversely with respect to the closing plane of its respective mold to shear off the unwanted material and to eject it from the machine.

References Cited

UNITED STATES PATENTS

| | | | |
|---|---|---|---|
| 3,458,897 | 8/1969 | Roger | 18—5 BS |
| 3,585,682 | 6/1971 | Martelli | 18—5 BP |
| 2,975,471 | 3/1961 | Sherman | 18—5 BS |

FOREIGN PATENTS

| | | | |
|---|---|---|---|
| 911,228 | 11/1962 | Great Britain | 264—98 |
| 783,487 | 4/1968 | Canada | 264—96 |

ROBERT F. WHITE, Primary Examiner

J. H. SILBAUGH, Assistant Examiner

U.S. Cl. X.R.

83—914; 264—161; 425—296, 326 B, 806